United States Patent [19]

Kordyban et al.

[11] 4,136,590

[45] Jan. 30, 1979

[54] FLOATING PAD SAW GUIDE

[75] Inventors: William W. Kordyban, Prince George, Canada; Lutz Claassen, deceased, late of Delta, Canada, by Gayle L. Claasen, administratrix

[73] Assignee: Hawker Siddeley Canada Ltd., Toronto, Canada

[21] Appl. No.: 823,085

[22] Filed: Aug. 9, 1977

[30] Foreign Application Priority Data

Aug. 12, 1976 [GB] United Kingdom ............... 33544/76

[51] Int. Cl.$^2$ ........................ B27B 11/02; B27B 5/38
[52] U.S. Cl. ......................................... 83/169; 83/820
[58] Field of Search ........................... 83/169, 13, 820; 30/123.3; 51/267

[56] References Cited

U.S. PATENT DOCUMENTS

| | | | |
|---|---|---|---|
| 3,540,334 | 11/1970 | McLauchlan | 83/169 X |
| 3,623,520 | 11/1971 | Neild | 83/820 |
| 3,674,065 | 7/1972 | Fairfield | 83/13 |
| 3,850,060 | 11/1974 | Wilcox | 83/169 X |

Primary Examiner—Jimmy C. Peters
Attorney, Agent, or Firm—Carver and Company

[57] ABSTRACT

A saw guide for use between a pair of circular saw blades fixed on an arbor which has a holder having an annular head in which the guide pad having parallel opposed guide faces has a loose axially movable and tiltable fit and which is stabilized in an aligned position relative to the saw blades by means of a pair of spaced apart lip seals mounted on the guide pad and bearing against the annular head, the pressure of the annular seals being increased by delivery of air between the lip seals, said air also passing through passages ported out of the faces of the guide pad.

6 Claims, 2 Drawing Figures

FLOATING PAD SAW GUIDE

BACKGROUND OF THE INVENTION

1. Field of the Invention

This invention relates to rotary saws, and in particular to a guide assembly using hydro-dynamic pressure lubrication for a plurality of circular saw blades fixed on an arbor.

2. Prior Art

The laws of lubrication, which are well established, apply without exception to saw guiding. If the lubricants supplied to the saw guide surface and, the surface which is in intimate contact with the rotating saw blade surface is intermittent or inadequate, a form of lubrication sometimes referred to as boundary or partial lubrication, occurs. In this case excessive wear of the guiding surface is prevented primarily by adhesion of lubricant to the surface and by selection of a low-friction material for the guiding surface. With this type of saw guide a liquid lubricant for which water is preferred is always required. However, because of only partial lubrication, a generally excessive quantity of water is required.

On the other hand, if a continuous film of lubricant is established between the saw guide and the saw blade and its film is stable, that is, it does not disappear intermittently, then air becomes a very excellent lubricant as it provides a higher load bearing capability. In saw guiding, liquid lubricants are not preferred because of the attendant relatively high consumption. Contrary to bearing lubrication, in saw guiding it is impractical to recirculate the lubricant within a closed system.

Techniques of using air or other lubricants are not new, but present systems, because of their design, do not establish stable air films and thus require excessive amounts of liquid lubricants.

Furthermore, present designs all rely upon one side of a saw guide being fixed. The saw references against the fixed side and the other side is either also fixed or floating. When a saw is rigidly mounted in collars, any small mis-alignment between the fixed saw and the fixed guide causes the hydro-dynamic film lubrication to break down, i.e. a diverging film of lubrication would be established. This is a problem that is well understood and was solved in bearing designs by allowing the guide surfaces or pads to tilt. Present guide systems, therefore, because of this problem are nearly always used with floating saws so that the saw blade itself will then align itself with the guide pad. Floating saw blades, however, which are normally guided by two or three small guide pads do not have the advantage of rigidly fixed saw blades as lateral stiffness of the latter saw measured in the tooth region is considerably greater than in a floating saw blade.

SUMMARY OF THE INVENTION

The present saw guide assembly uses air as the primary fluid to establish a continuous and stable fluid film between saw guiding surface and the rotating saw blade.

The guide assembly of the present invention furthermore provides automatic alignment of guide pads with fixed saw blades.

DETAILED DISCLOSURE

Figure 1:
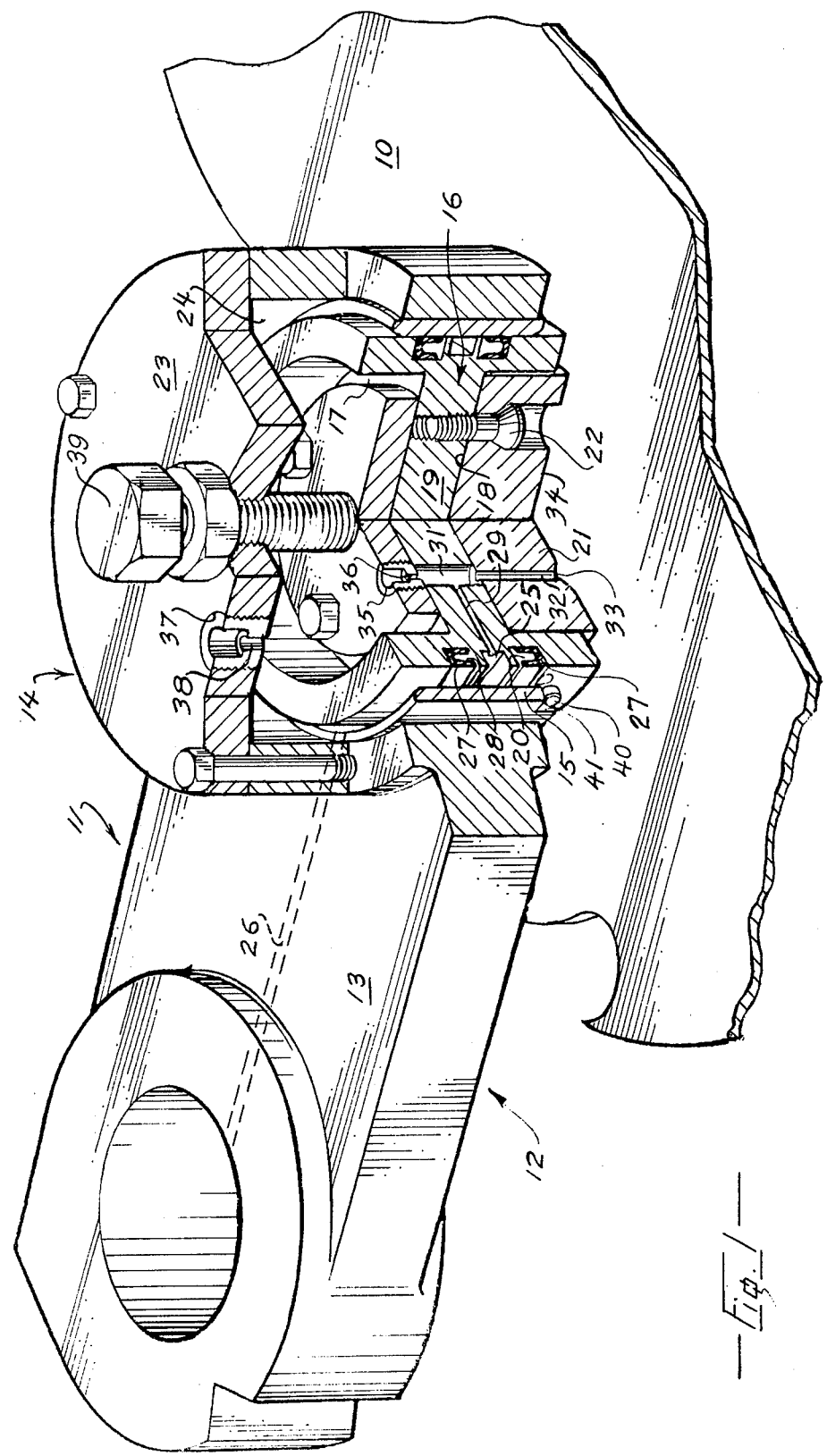
FIG. 1 is a perspective view with portions partially removed of a portion guide assembly of the present invention, positioned against the outer surface of a saw blade which is the outer blade of a plurality of saw blade sets.
Figure 2:
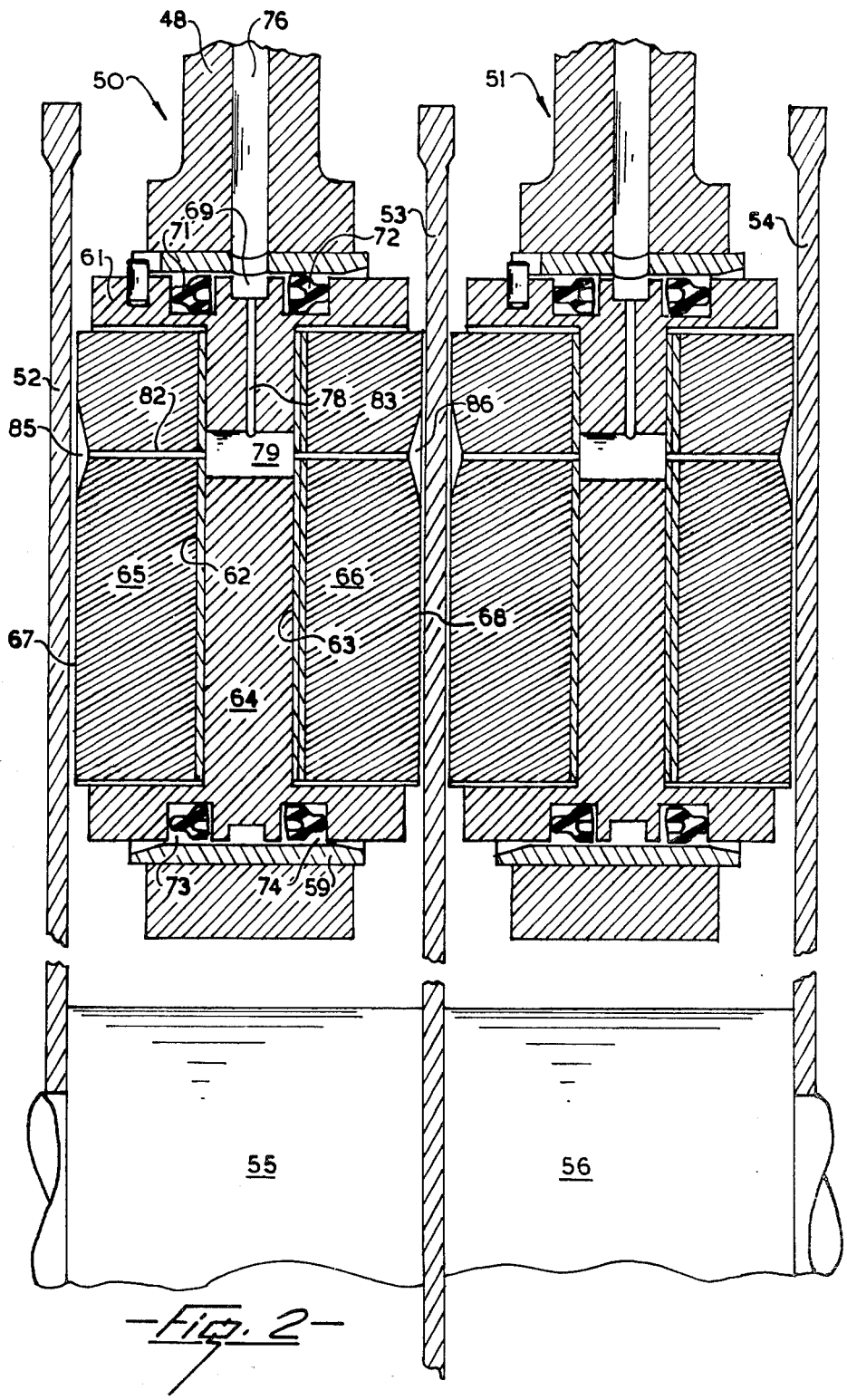
FIG. 2 is a central sectional view of a pair of saw guide assemblies of the present invention positioned between saw blades of a saw blade set.

Referring to FIG. 1, the numeral 10 designates a saw blade which is an outer one of a saw blade set, which is fixed for rotation on an arbor (see FIG. 2). The numeral 11 designates a guide member of the present invention which is disposed to contact the outer surface of the saw blade 10. The guide member which is mounted in a conventional manner on the saw frame (not shown) can adjustably be positioned in a direction parallel to the saw arbor. The guide member has an arm 13 and an annular head 14 within which a cylindrical sleeve 15 has a press fit.

A disc-like guide pad carrier 16 which has a loose fit in the sleeves has a pair of cylindrical sockets 17 and 18 formed in opposite side faces so as to leave a central web 19. A disc-like guide pad 21 is fitted in the socket 18 and is secured to the carrier web by machine screws 22. An air-tight cover 23 is secured to the head portion of the guide frame over the guide pad carrier to provide a pressure chamber 24.

The guide pad carrier has a centrally located circumferential groove 25 which receives pressurized air through a passage 26 (broken lines) which extends through the guide arm. A pair of annular lip seals 27—27 are positioned in grooves 28—28 on opposite sides of the circumferential groove 25, the lip seals making sealing contact with the sleeve 15. Pressurized air from the circumferential groove 25 passes through a restricted passage 29 into a plenum chamber 31 formed in the carrier web. Air from the plenum chamber passes outwardly through a further restricted passage 32, formed through the guide pad 21, the passage 32 being ported at its outer end into a conical socket 33 formed in the guide pad face 34 which confronts the saw blade 10. Depth of the conical socket is approximately equal to three time the gap between the face of the guide pad and the saw blade 10.

Air from the plenum chamber 31 is also exhausted through a fitting 35 having a restricted passage 36 into the pressure chamber 24. As shown in FIG. 1, the cover also has a fitting 37 provided with a restricted passage 38. Maximum excursion of the carrier in a direction away from the saw blade is set by a capscrew 39 projecting from the cover 23. Rotation of the carrier within the sleeve is prevented by engagement of a lug 40 projecting from the carrier, with a stop face 41 formed in the sleeve.

FIG. 2 shows a pair of identical guide assemblies 50 and 51 which are arranged between three saw blades 52, 53 and 54 being inner saw blades of the saw blade set. The blades being spaced apart in fixed relationship by spacers 55 and 56.

The guide member 50, like guide member 10, has a guide arm 57 and an annular head 58 within which a disclike guide pad carrier 61 has a loose fit. The carrier 61 has a pair of annular sockets 62 and 63 on opposite sides of a central web 64. Guide pads 65 and 66 are secured in the sockets 62 and 63, and have opposite parallel planar faces 67 and 68. Distance between the faces 67 and 68 of the guide pads 65 and 66 is approximately 0.002 to 0.003 inches less than distance between the confronting faces of the saw blades 52 and 53. The carrier 61, like the carrier 16, has a central circumferential groove 69 on opposite sides of which are a pair of annular lip seals 71 and 72 fitting in grooves 73 and 74, the lip seals bearing against the sleeve 59. Pressurized air injected into the circumferential groove 69 through a passage 76 extending through the guide arm 57 passes from the circumferential groove 69 through a passage 78 into a plenum chamber 79 in the web 64. Air from the plenum chamber 79 is directed through restricted passages 82 and 83 through the guide pads 65 and 66, thence into conical pockets 85 and 86 formed in the faces 67 and 68 of the pads.

In operation pressurized air is admitted to all guide members at approximately 3 to 5 psi with the saw blades run up to operating speeds. At this pressure, although the lip seals are in sealing engagement with the sleeve, the guide pad carriers are relatively free to find positions of alignment with the saw blades which they confront. Air pressure is then increased (40 psi being suitable) which thus increases the pressure of the lip seals against the walls of the sleeves so that the carriers are relatively firmly fixed in the aligned position. Due to the restricted air passages 38 pressure in the pressure chamber 24 counteracts outward pressure against the outermost guide pads. If due to excessive external forces against one or more pads sufficient to shift the carriers in their respective sleeves. Air pressure is reduced to again allow the pads to find the aligned position and the pressure is then increased and sawing resumed.

In operation, the guide carriers are however, free to twist and move small amounts, through distortion of the lip seals, so that accurate alignment relative to the saw blades will be maintained when for instance lateral forces on the saws cause the saw blades to distort. Generally when sawing, lateral forces are created from improper feeding of a wood item through the sawing machine, thus the forces and distortion generally affect more than one saw. Thus, even though the guide carrier is a rigid item with parallel faces, it will align itself relative to the saws, so that a converging fluid film, in the direction of rotation of the saws, is established on either side of the guide carrier. A converging fluid (i.e. air) film is a stable lubricating film and thus stable lubrication will be maintained at all times.

It is seen that stability of air film between the pads of the guide members 50 and 51 and the saw blades is maintained by the restricted passages which feed the air to each of the pad surfaces. When a saw is pushed by external forces against one pad, the guiding pressure will always rise for this pad due to a reduced gap and will fall on the other side, the side where the gap becomes larger. The diameters of the restricted passages leading air into the guide pad surfaces are chosen such as to cause a high rate of change of the guiding pressure with small changes in the gap distance.

In order to achieve good stability over a wide range of gap heights and at high surface speeds of the saw, the pockets and passages feeding air there into are located adjacent the upstream side of each of the guide pads relative to the direction of rotation of the saw. Optimized flow conditions (a positive net force separating the saw blade from the guiding surface) cannot be maintained with a centrally located passage as is presently common on guides that are purported to operate with air. The slightly recessed pockets create a Rayleigh step which further enhances positive pressure at high saw speeds. The recessed pockets further prevent the establishment of net negative forces or suction forces on the guide surfaces which otherwise could be established when the running clearance becomes extremely small, this being the results of the lateral force on the saw having become larger than the load bearing capacity of the guide.

Further, although air is used as the primary fluid, to establish a continuous stable fluid film between the guide pad surface and the rotating saw for saw cooling purposes a small amount of oil or water can be added to the air flow on a continuous basis. It is to be understood that when a liquid is added the restricted passages would be suitably modified to reflect the fluid properties of the mixture. Addition of liquid further prevents buildup of pitch on the saws and also aids in the lubrication when a saw is excessively bent due to a cause other than normal sawing.

We claim:
1. A saw guide for use between circular saw blades fixed on an arbor comprising:
 (a) guide holder means having a cylindrical annular head extending between the saw blades,
 (b) a cylindrical guide member having flat parallel opposed faces confronting the saw blades and having a loose axially movable and tiltable fit in the annular head,
 (c) a pair of annular lip seals mounted on the guide member in spaced relationship having a deformable resilient sealing fit against the annular head,
 (d) first fluid passage means extending through the guide holder means for delivering fluid under pressure between the lip seals,
 (e) second restricted fluid passage means extending through the guide member having an intake port between the annular lip seals and discharge ports opening out of the faces of the guide member for enabling variation of sealing frictional pressure of the lip seals against the annular head corresponding to variation in pressure of fluid delivered through said first fluid passage means.

2. A saw guide as claimed in claim 1 in which the guide member comprises a cylindrical guide carrier having a loose axially movable tiltable fit in the annular head and having sockets in opposed side faces and guide pads seated in the sockets.

3. A saw guide as claimed in claim 1 in which the discharge ports of the guide members open into outwardly diverging conical pockets.

4. A saw guide as claimed in claim 1 in which the fluid discharge ports are eccentrically located and positioned on the upstream side of the guide assembly relative to direction of rotation of the saw blades.

5. A saw guide as claimed in claim 3 in which the fluid discharge ports are eccentrically located and positioned on the upstream side of the guide assembly relative to direction of rotation of the saw blades.

6. A saw guide as claimed in claim 3 in which depth of the conical pockets is substantially three times as great as width of a predetermined clearance gap between the associated guide face of the guide member and the confronting saw blade.

* * * * *